Aug. 19, 1969   J. J. LUKAWICH ET AL   3,461,737
COMPOSITE GEARS
Filed Oct. 6, 1967

INVENTORS.
Joseph J. Lukawich and
Robert W Graft
BY
ATTORNEY

United States Patent Office 3,461,737
Patented Aug. 19, 1969

3,461,737
COMPOSITE GEARS
Joseph J. Lukawich and Robert W. Graft, Somerville, N.J., assignors to The Singer Company, New York, N.Y., a corporation of New Jersey
Filed Oct. 6, 1967, Ser. No. 673,428
Int. Cl. F16h 55/16
U.S. Cl. 74—443                                                          6 Claims

ABSTRACT OF THE DISCLOSURE

A gear comprising a cast metallic core having a hub portion and a toothed portion integrally formed therewith, wherein the teeth formed on the latter portion are undersized. The toothed portion of the core is provided with an overlay of polyurethane, which is molded into the correct tooth form and is secured on the core at one end by overlying an annular flange formed on the core and at the other end by causing the polyurethane to enter into an undercut area provided on the body of the core.

BACKGROUND OF THE INVENTION

Field of the invention

The present invention relates to composite gears having a metallic hub and preferably, a polyurethane overlay or contact surface disposed thereon. More specifically the invention is concerned with securing the polyurethane overlay in a composite gear to the metallic hub.

Description of the prior art

In the past, gears generally have been formed of metallic material because of the desirable strength characteristics of this material. However during machine operation, the metallic gears, in addition to a certain amount of frictional wear, also produce an unpleasant noise problem. The advent of more complex machinery greatly has increased the number of gears with a corresponding significant increase in the accompanying noise.

SUMMARY

It has been found that forming a composite gear having a metallic hub and a toothed portion having a polyurethane contact surface formed thereon substantially reduces the noise level. The present invention provides a novel arrangement for securing the polyurethane overlay to the metallic hub so that the resulting gear can withstand a high degree of torque and will not distort and slip during operation.

Accordingly, it is an object of this invention to provide a new and improved composite gear having a metal hub and plastic overlay with means for uniting these members.

Another object of this invention is to provide a gear hub having at least one annular groove which cooperates with on overlaid material to securely lock the latter in place so as to prevent distortion and slippage thereof adjacent the gear hub.

Still yet another object of this invention is to provide on a metal body having a plurality of projections, a plastic casing disposed so as to form a plurality of operable gear teeth.

Having in mind the above and other objects that will be evident from an understanding of the disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

DESCRIPTION OF THE PREFERRED EMBODIMENTS

Figure 1:
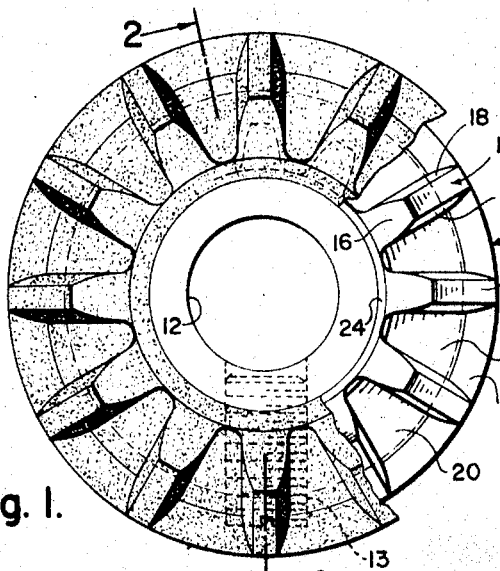
FIG. 1 is a plan view, partly broken away, of gear embodying my invention.
Figure 2:
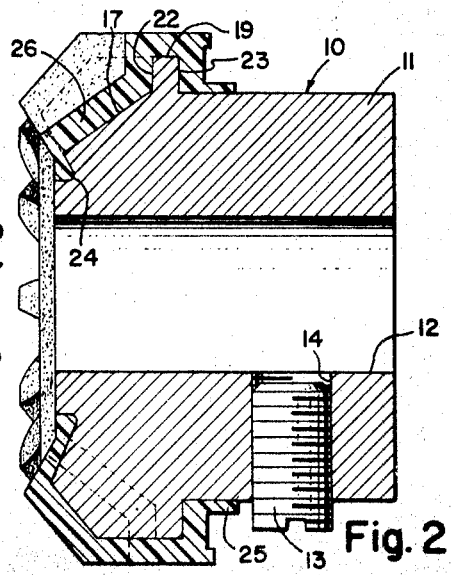
FIG. 2 is a sectional view taken substantially along the lines 2—2 of FIG. 1.

Referring now more particularly to the drawings, and especially to FIGURES 1 and 2, there is disclosed a composite gear 10 formed of two different materials. The inner member or hub portion 11 is formed of metal or a material of similar characteristics having a cylindrical opening or bore 12 formed therein for receiving a shaft (not illustrated). The composite gear 10 is connected to the shaft preferably by means of a set screw 13 threaded into an opening 14 located in the hub portion. The hub portion 11 has a plurality of undersized bevel teeth 15 provided on the face thereof. Each of the teeth 15 comprises an upper portion 16 inclined outwardly from a top face of the gear, a substantially vertical portion 17 inclined inwardly from the face of the gear and side portions 18. The second mentioned tooth portions 17 depend from a flange 19 formed integral with the hub to strengthen the gear. A plurality of web portions 20 extend between and connect the teeth 15. Each of the web portions rearwardly merges into a transverse extending flange surface 22 which is integrally formed with the flange portion 19 to form a continuous annular anchor portion having a lower surface 23. An annular groove 24 is formed adjacent the innermost boundary of the portion 16 of the gear tooth 15 being disposed between the teeth and the bore 12. A plastic overlay 26, preferably composed of polyurethane, completely envelops the annular anchor portion of the hub element. The overlay 26 may be molded to the hub element, though it is within the scope of this invention to use other means to secure it to the gear hub. The overlay extends from the annular groove 24 over the bevel teeth 15, web portion 20, flange portions 19 and 22, and then over the surface 23, whereupon the overlay culminates in an annular portion 25. Molding of the polyurethane into the groove 24 effectively keeps the outer layer of material secured to the hub. This type of overlay has been found effective substantially to eliminate machine noise and to prevent slippage on said hub when subjected to torque forces. The overlay completely envelops said anchor means to rigidly secure the hub to prevent relative axial displacement thereof. Also, by molding the polyurethane onto the metal gear in a predetermined manner the resultant gear teeth have the configuration necessary to form an operable gear.

Figure 3:
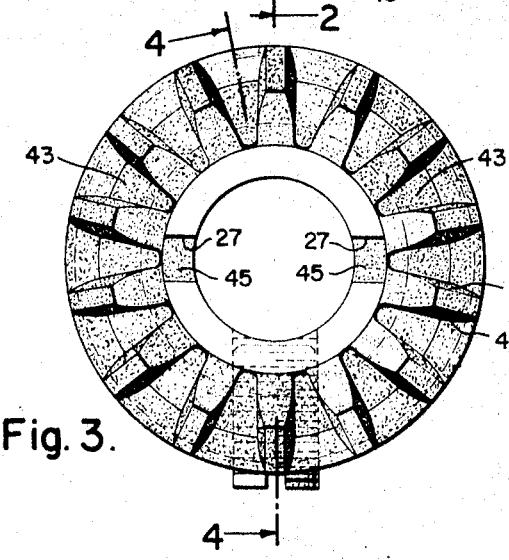
FIG. 3 is a plan view of another embodiment of my invention.
Figure 4:
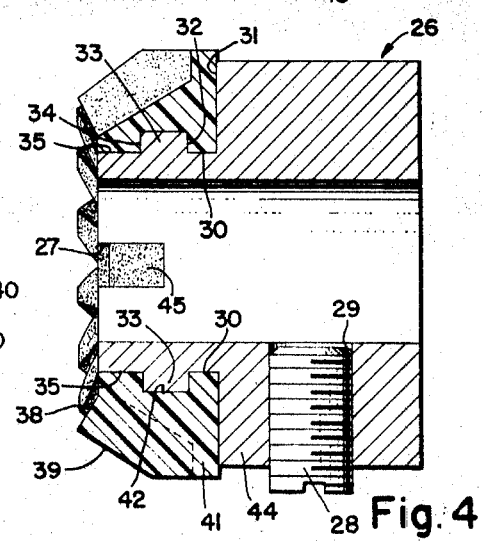
FIG. 4 is a sectional view taken substantially along the lines 4—4 of FIG. 3.

FIGURES 3 and 4 disclose another embodiment of the present invention wherein a different form of the composite gear is illustrated. The inner member or hub portion 26 is formed of metal or a material of similar characteristics and has a cylindrical opening through which a shaft (not illustrated) extends. The hub portion 26 has two diagonally opposed rectangular axially extending keyways 27, formed in the face portion thereof. The composite gear 26 is connected to the shaft by means of a screw 28 extending through an opening 29 in the hub portion. An annular groove 30 is formed in the hub by upstanding surfaces 31 and 32. A continuous anchor portion 33 is adjacent the annular groove 30 and is defined by surfaces 32 and 34. Surface 34 extends from a vertical surface 35, which is parallel to the major axis of the gear. In this embodiment all of the teeth and their intermittent web portions are formed completely of a plastic material, preferably polyurethane. The bevel teeth are of the same general configuration as that of the embodiment of FIGURES 1 and 2, and have a portion 38 inclined outwardly from the face of the gear, a portion 39 inclined inwardly toward the face of the gear and side portions 40. The second mentioned tooth portions merge into a flange 41 formed to strengthen the teeth. Web portions 43 extend between and connect the teeth. The web portions rearwardly merge into a flange portion 44 which is integral with the anchor portion 33 to form a continuous annular portion. The web portion has a notch 42 formed therein so as to fit snugly upon and completely envelop the continuous annular anchor portion 33. Blocks 45 of the material are integral with the plastic material forming the teeth and webs, and fit snugly into the keyways 27 of the hub. The bevel gears and web portions of this embodiment are described as molded to the hub element though it is within the scope of this invention to use other means to form this composite gear.

For example, a double molding process may be employed wherein a steel insert has molded thereon in a suitable manner a layer of polycarbonate material into a configuration defining a plurality of undersized gear teeth. The gear teeth having the correct shape and size then are formed by depositing a layer of polyurethane over the layer of polycarbonate material.

Numerous alterations of the structure herein disclosed will suggest themselves to those skilled in the art. However, it is to be understood that the present disclosure relates to a preferred embodiment of our invention which is for purposes of illustration only and not to be construed as a limitation of the invention. All such modifications which do not depart from the spirit of the invention are intended to be included within the scope of the appended claims.

Having thus described the nature of the invention, what we claim is:

1. An integral gear comprising a metal hub portion having a bore formed therein and a metal portion having a plurality of projections formed thereon, a plastic casing formed on said latter metal portion, said hub portion including means for securing said plastic casing to said gear, said means comprising an annular groove disposed adjacent the bore formed in the hub, said projections having a configuration incapable of defining an operable gear, said casing being disposed in the groove and on said metal portion in such a manner as to form a plurality of teeth whose configuration defines a plurality of operable gear teeth.

2. A gear according to claim 1 wherein said plastic casing comprises polyurethane material.

3. A gear according to claim 1 wherein said teeth on said toothed portion are of the bevel tooth type configuration.

4. A gear according to claim 1 wherein a continuous flange axially spaced from the annular groove is provided in the hub whereby the projections are disposed between the flange and the groove, said plastic casing completely enveloping said continuous flange.

5. A composite gear comprising an inner metal hub portion and a toothed portion depending therefrom having a plurality of spaced teeth formed thereon, said teeth being undersized relative to the tooth configuration required for an operable gear, a layer of plastic material covering at least the toothed portion of said gear, said plastic material being formed around each of said undersized teeth into a configuration having the correct operable gear tooth shape, and means on said hub portion for locking said material onto said metal gear, the locking means comprising an annular flange and an undercut disposed along the axis of the hub portion with the annular flange being formed on said hub portion at one end and the undercut being formed adjacent to the flange, said plastic material overlooking said flange and entering into said undercut for locking said material relative to the metal gear.

6. A gear according to claim 5 wherein the locking means includes at least one keyway for receiving the plastic material.

References Cited
UNITED STATES PATENTS

| | | | |
|---|---|---|---|
| 3,013,440 | 12/1961 | White | 74—443 X |
| 3,199,364 | 8/1965 | Dew | 74—443 X |
| 3,272,027 | 9/1966 | Wayman | 74—434 X |
| 3,304,795 | 2/1967 | Rouveral | 74—443 X |

LEONARD H. GERIN, Primary Examiner